(No Model.)
G. A. ROBERTS & C. SCHAFER.
THRASHING MACHINE.
No. 277,347. Patented May 8, 1883.
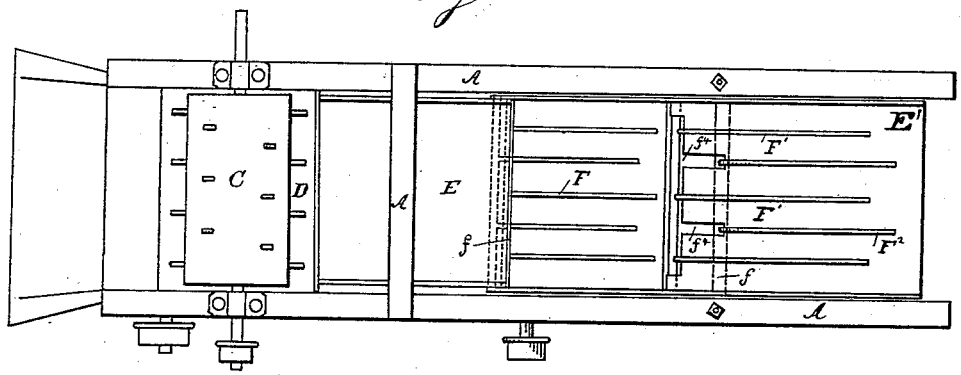
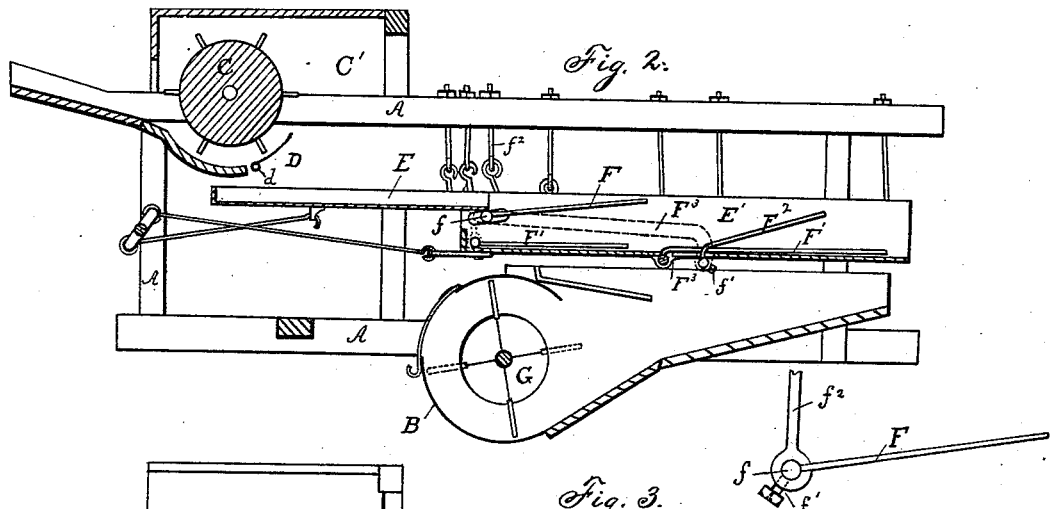
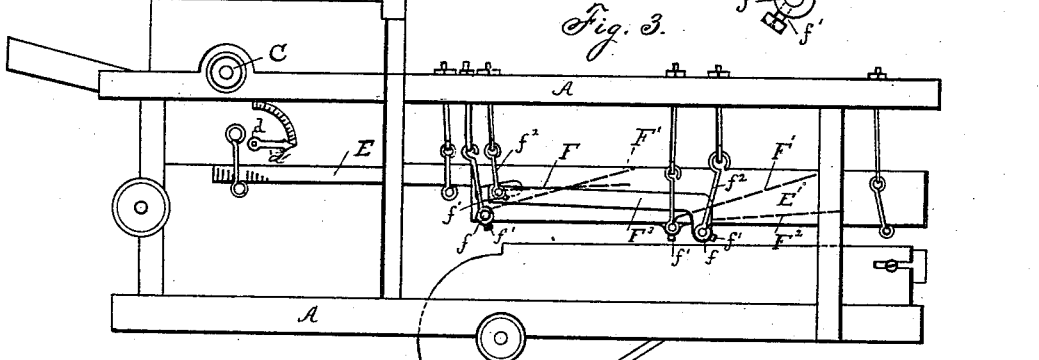
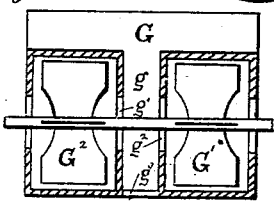
WITNESSES
Samuel E. Thomas
J. Edward Warren
INVENTORS
George A. Roberts
Christian Schafer
By W. W. Leggett
Attorney

UNITED STATES PATENT OFFICE.

GEORGE A. ROBERTS AND CHRISTIAN SCHAFER, OF THREE RIVERS, MICHIGAN, ASSIGNORS TO CYRUS ROBERTS, OF SAME PLACE.

THRASHING-MACHINE.

SPECIFICATION forming part of Letters Patent No. 277,347, dated May 8, 1883.

Application filed March 30, 1882. (No model.)

*To all whom it may concern:*

Be it known that we, GEORGE A. ROBERTS and CHRISTIAN SCHAFER, of Three Rivers, county of St. Joseph, State of Michigan, have invented a new and useful Improvement in Thrashing-Machines; and we declare the following to be a full, clear, and exact description of the same, such as will enable others skilled in the art to which it pertains to make and use it, reference being had to the accompanying drawings, which form a part of this specification.

In the drawings, Figure 1 is a plan view of an apparatus embodying our invention, the top being removed, so as to show the rakes upon the separator. Fig. 2 is a longitudinal vertical central section of the same. Fig. 3 is a side elevation. Fig. 4 illustrates the fan.

The objects of our invention are to thoroughly loosen up the straw, so that the grain will become separated therefrom as it passes over the shakers, and to facilitate the passage of the straw over said shakers; and with these ends in view the invention consists in certain novel combinations of devices, which will be hereinafter particularly described, and pointed out in the claims.

In carrying out our invention, A is the ordinary frame-work of any grain or seed thrashing-machine.

B is its fan-case; C, its thrashing-cylinder.

D is a wing-board pivoted at its heel $d$, and provided with an exterior adjusting-arm, $d'$. This wing-board is designed, by being properly adjusted for any particular character or condition of straw, to cause the said straw to be delivered from the cylinder upon the front end of the straw-shaker adjacent to the cylinder, so that it shall have the benefit of a travel over the whole length of the straw-shaker. This feature is of considerable value, for, suppose the straw to be long or heavy and damp, then the wing-board can be let down and the straw will naturally be delivered upon the extreme front end of the shaker. But suppose the straw to be short or light and dry. In this case in discharging from the cylinder it would naturally shoot well rear and fall considerably to the rear of the front end of the shaker, and the grain will be imperfectly separated. This difficulty can be quickly overcome by simply adjusting the wing-board up. This causes the mass to rise and then drop down onto the shaker at the proper point; or, if a feeding-reel is suitably located—say at $C'$—the board may direct the mass up against this reel, and the latter will drive it down upon the shaker.

E and $E'$ are straw-shakers. These straw-shakers are so connected with the driving mechanism in any usual way that a counter movement is given to them.

F is a set of rake-fingers connected with the shaker E. These fingers are attached to a rocker-bar, $f$, which at its end is adjustably engaged by a sleeve and set-screw, $f'$, to an arm, $f^2$, which latter is fastened at its upper end to the side of the machine or to any rigid support. By this adjustable fastening the fingers may be given any desired set, so as to rise to a greater or less distance, as may be required by the peculiar character of the straw and grain being thrashed.

$F'$ represents similar sets of rake-fingers, connected with the shaker $E'$. That set at the front extremity of the shaker $E'$ is so adjusted with respect to the set F that they rise and fall alternately, so as to pass through or past each other, and thus effectually whip and agitate the mass at this point as it passes over the rakes.

$F^2$ represents what I term a set of "carrying-fingers." They are in like manner connected with a rocker-bar, $f$, and lever-arm $f^2$; but the rocker-bar is not fastened to the separator. On the contrary, its ends engage with an arm, $F^3$, which leads back to the shaker E, so that as the shaker E moves rearward this rocker-bar and its fingers $F^2$ also move rearward, rising at the same times so as to lift the straw and carry it rearward while the adjacent shaker $E'$ is moving toward the front. These fingers we prefer also, as shown, to alternate with an adjacent set, $F'$, so that they will move through or past each other and whip the mass passing through the machine and over them.

We would have it understood with respect to these sets of rake-fingers that we do not confine ourselves in their use to thrashing-machines which have two or more shakers, but contemplate their use with either single or double shakers, and in the case of a single shaker motion may be given to the carrying-fingers F² by connecting the arm F³ to any moving part of the machine which will give to it its requisite motion.

G is a fan located in any usual place. It is formed of two parts, G' and G², so that between these two parts there is left room at $g$ for air to enter the eyes $g'$ and $g^2$ to the fans at these points, and a gate or gates, $g^3$, may serve to regulate the amount of air admitted to the fans. These fans (or this "double" fan, as it may be termed) have the usual eyes at their outer ends for the admission of air; but by thus admitting air also at the center the fans are enabled to take in and deliver a more effective blast than is possible with a single long fan of the usual kind, for with the latter fan there is always at the middle a portion which is practically of no use, because it is impossible for the fan to draw air to its middle from the distant eyes, and whatever of a vacuum is produced at this middle point serves to prevent, rather than to assist, the action of the fan. The fingers of the carrying-rakes pass upward through corresponding slots, $f^4$, in the shaker.

What we claim is—

1. The combination, with a straw-shaker, of two sets of rake-fingers arranged to take the straw therefrom, one set pivoted above the other, and means for vibrating said sets of fingers past each other in opposite directions, substantially as and for the purpose set forth.

2. The combination, with a straw-shaker, of a rock-bar mounted independently thereof, the straw-carrying fingers projecting from said rock-bar over said shaker, and means for giving said rock-bar a lateral reciprocating motion opposite to that of the shaker, and a simultaneous rocking motion, thereby causing the carrying-fingers to vibrate up and down, as well as to move longitudinally, substantially as and for the purpose set forth.

3. The combination, with a straw-shaker, of one or more sets of carrying-fingers arranged above the same, and means for causing said fingers to rise and move forward as the shaker moves backward, and to fall and move backward as the shaker moves forward, substantially as described.

4. The combination, with two connected moving straw-shakers, one in advance of the other, of two sets of rake-fingers, one set connected to the rear end of the first shaker, and the other set connected to the front end of the second shaker and under the set connected to the first shaker, and means for raising the fingers of each set as the shaker to which it is connected moves rearward, and vice versa, substantially as described, whereby the fingers of the two sets will be caused to pass each other in opposite directions as the shakers operate.

5. In a separator, the combination, with two shakers arranged one in advance of and above the other and having counter movements, of a rake-head and a set of straw-fingers journaled at the junction of the two and moving with the upper shaker, said fingers constructed to rise and move forward as the upper shaker advances, and to drop and move backward as the upper shaker recedes, substantially as described.

6. In a separator, the combination, with two reciprocating shakers arranged one in rear of and below the other and having counter movements, of a set of straw-fingers and a rake-head journaled at the junction of the two, said rake-head being arranged to move with the upper shaker, the rearward shaker being provided with longitudinal slots adapted to receive said rake-head, and in which it may have a reciprocating movement, substantially as described.

In testimony whereof we sign this specification in the presence of two witnesses.

GEORGE A. ROBERTS.
CHRISTIAN SCHAFER.

Witnesses:
J. D. SALSIG,
JAMES B. ROBERTS.